July 25, 1933.    E. B. POKE    1,919,597
CLOSURE FOR METAL DRUMS OR THE LIKE
Filed Aug. 14, 1931

ERNEST BERTRAM POKE
Inventor

By Haseltine, Lake & Co.
Attorneys

Patented July 25, 1933

1,919,597

UNITED STATES PATENT OFFICE

ERNEST BERTRAM POKE, OF MADRAS, BRITISH INDIA

CLOSURE FOR METAL DRUMS OR THE LIKE

Application filed August 14, 1931. Serial No. 556,985.

This invention relates to an improved closure for metal drums or like containers of petrol, oil and similar substances and has for its object to provide a strong and leak proof closure at an economical cost.

According to the invention the closure comprises a bung or socket secured to the inside of one end of the drum, the socket being preferably made of cast iron and welded in position and has a cap fitted with a washer which covers over and closes the hole in the socket.

The socket is of flat cylindrical shape with an open end having an outer flange by which it is secured to the inner face of the container. The other end of the socket is cast with a hole and a ring shaped flange or lip the inner face of which is faced. The top inner periphery of the socket is screw-threaded (standard gas, right hand threads) to receive the closure cap which is screw-threaded to correspond on its outer periphery.

The cap is made of two parts, the upper and larger part is screw-threaded to engage the socket and is bored centrally on its lower face and screw-threaded therein to receive the corresponding lug or stud of the lower part of the cap, the washer of leather or other suitable material is slotted centrally and held between these two parts, the central lower part of the cap projects or is extended to form a nut so as to ensure it being screwed tightly in position by means of a spanner.

The upper part of the cap has on its outer face a square recess to ensure it being screwed tightly into the socket by a suitably shaped spanner or key when the cap is screwed into the socket "tightly" (for it must be screwed in as tightly as possible) the leather washer becomes squeezed or compressed between the cap and the lip of the socket wall, thus making a joint which will only allow liquids or gas to pass it under enormous pressure.

This action is aided by the fact that the lower part of the cap also compresses the leather washer against the upper part of the cap and the lower part of the cap just below the washer is designed to fit with as little clearance as possible into the hole in the socket, leaving a clearance of say $\frac{1}{32}$ of an inch which is so small that it reduces the pressure of the liquid or gas at the joints to the absolute minimum.

The cap when in position is made to screw into the socket with its outer face level with or slightly below the surface of the container so as to avoid damage to the closure in transit.

The invention is more particularly illustrated in the accompanying drawing in which:—

Referring to the drawing:—

Figure 1:
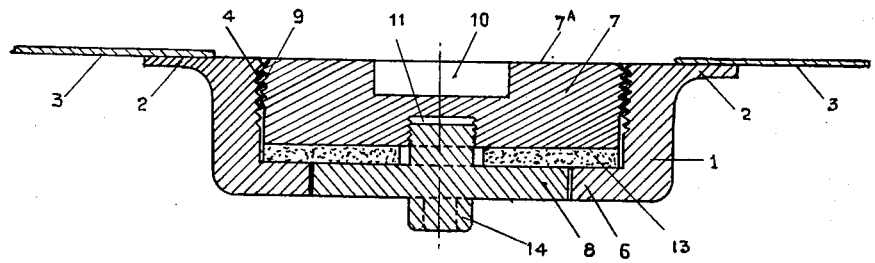
Fig. 1 is a sectional view of the cap in position in the socket.
Figure 2:
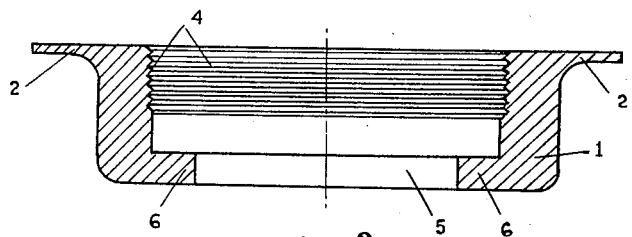
Figs. 2 and 3 are sectional views of the socket and cap respectively.
Figure 3:
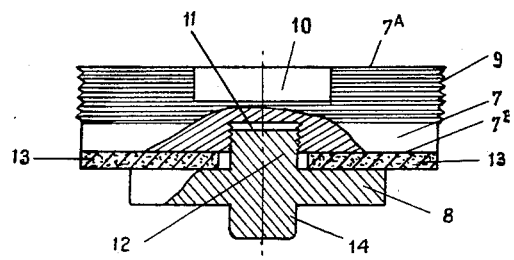

The socket 1 which is of flat cylindrical shape having an outer flange 2 by which it is secured such as by welding to the inner surface 3 of the drum or other container. The inner periphery of the barrel of the socket is screw-threaded at 4, and the further end of the socket is cast with a central hole 5 and surrounding lip 6.

The cap is composed of two parts 7 and 8 the larger part 7 being of cylindrical shape having screw-threads 9 for a part of its periphery which engage the screw-threads on the socket. The upper surface 7A of the part 7 has a sunk recess 10 of square section by which the cap can be screwed in tightly by a suitable spanner or key. The lower surface 7B of the part 7 has a screw-threaded recess 11 to accommodate a screw-threaded stud or lug 12 of the lower part 8 by means of which a disc of leather 13 with a hole punched centrally is tightly secured between the two parts, the leather being of the same diameter as that of the upper part 7.

The lower part 8 is also of cylindrical shape made to a diameter very slightly less than the opening 5 in the bottom wall of the socket and has centrally thereon on its lower face a square or hexagon shaped lug 14 by which it can be turned by a spanner. The upper surface of the lip 6 is faced so that the washer 13 which is secured between it and and the lower surface 7B of the part 7 forms a tight joint. The clearance between the circumference of the part 8 and the hole 5 is small so that there is very little pressure and consequently no leakage at the joint.

Having now particularly described and ascertained the nature of my said invention and in what manner the same is to be performed I declare that what I claim is:—

1. A closure for a metal drum having a threaded socket provided with a bottom lip or shoulder, including a two part cap comprising an exteriorly threaded annular member fitting said threaded socket and terminating short of the bottom thereof, a compressible washer disposed upon the bottom face of said annular member adapted to rest upon said bottom lip of the socket, and a second cap member having both a portion projecting through said washer and secured in said annular member and also a flange extending beneath and securing said washer to the annular member, which flange is adapted to occupy the hole bounded by said socket lip and is generally flush with the lower exposed portion of the bottom of the socket.

2. A closure for a metal drum having a threaded socket provided with a bottom lip or shoulder, including a two part cap comprising an exteriorly threaded annular member fitting said threaded socket and terminating short of the bottom thereof, a compressible washer disposed upon the bottom face of said annular member adapted to rest upon said bottom lip of the socket, and a second cap member detachably secured to said annular member through the central portion of said washer and provided with a flange extending beneath and securing said washer to the annular member, which flange is adapted to occupy the hole bounded by said socket lip and to extend to the lower exposed bottom portion of the socket.

ERNEST BERTRAM POKE.